United States Patent
Raji et al.

[11] Patent Number: 5,931,198
[45] Date of Patent: Aug. 3, 1999

[54] FABRIC REINFORCED PIPE

[76] Inventors: Brian Behzad Raji, 1109 W. Lakeridge Dr., Gilbert, Ariz. 85233; Edward Robert Fyfe, 1339 Ocean Ave., Del Mar, Calif. 92014

[21] Appl. No.: 08/961,534

[22] Filed: Oct. 30, 1997

[51] Int. Cl.⁶ .................................................. F16L 55/162
[52] U.S. Cl. .................................. 138/98; 138/99; 138/97
[58] Field of Search .................................. 138/97, 98, 99

[56] References Cited

U.S. PATENT DOCUMENTS

| | | | |
|---|---|---|---|
| 2,312,993 | 3/1943 | Stephens | 138/98 |
| 3,996,967 | 12/1976 | Takada | 138/97 |
| 4,009,063 | 2/1977 | Wood | 138/97 |
| 4,684,556 | 8/1987 | Ohtsuga et al. | 138/97 |
| 4,877,665 | 10/1989 | Higuchi et al. | 138/98 |
| 5,030,493 | 7/1991 | Rich | 138/97 |
| 5,077,107 | 12/1991 | Kaneda et al. | 138/98 |
| 5,218,810 | 6/1993 | Isley, Jr. . | |
| 5,271,433 | 12/1993 | Schwert et al. | 138/98 |
| 5,280,811 | 1/1994 | Catallo et al. | 138/97 |
| 5,348,801 | 9/1994 | Venzi et al. | 138/97 |
| 5,649,398 | 7/1997 | Isley, Jr. et al. . | |

*Primary Examiner*—James F. Hook
*Attorney, Agent, or Firm*—Limbach & Limbach L.L.P.

[57] ABSTRACT

Reinforcement of buried or inaccessible existing pipes is achieved by applying a reinforcement layer which includes a fabric portion. A pipe system structure is achieved which permits an internal or external surface of an existing pipe wall to be reinforced without removing a section of the pipe and without requiring the pipe to be out of service of a long period of time. The reinforcement layer overlays a portion of the internal or the external surface of the pipe. An adhesive material is then applied to the surface of the pipe or to the reinforcement layer for bonding the reinforcement layer to the surface of the pipe to develop a composite system between the existing pipe and the reinforcement layer.

18 Claims, 6 Drawing Sheets

FABRIC REINFORCED PIPE

BACKGROUND OF THE INVENTION

1. Field of the Invention

The present invention relates a method and apparatus for reinforcing pipe walls to increase their strength and ductility without removing a section of the pipe from its original position.

2. Related Art

In general, pipes either below or above ground need to be repaired after a number of years of operation due to deterioration. Existing pipes formed from steel and/or concrete have numerous problems. For example, steel pipes are prone to losing their structural integrity over time due to corrosion and concrete pipes are subject to deterioration due to permeability of the exposed concrete by water.

Previously, repairing pipes involved excavating the pipe from the ground, removing the section to be repaired and burying a new section. This process was expensive and time consuming, and also required that the pipe be out of service for a period of time. Subsequently, methods for repairing cracks and breaks in pipes have been developed whereby the pipes need not be excavated in order to be repaired. These methods include the use of inserts to act as new pipe walls.

One such method of repairing an underground pipe involves inserting a sufficiently long tubular flexible liner bag into the pipe by means of a pressurized fluid, such as air or water. The tubular liner bag is made of a flexible resin-absorbent material impregnated with a thermosetting resin, and the outer surface is covered with a water impermeable plastic film.

In particular, the tubular flexible liner bag is closed at one end and open at the other. The tubular flexible liner bag is first flattened, and then, the closed end of the tubular liner bag is tied to a control rope. The open end of the tubular liner bag is made to gape wide and is hooked (anchored) at the end of the defective or old pipe in such a manner that the wide-opened end of the liner completely and fixedly covers and closes the pipe end. A portion of the liner is pushed into the pipe. The pressurized fluid is applied to the portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. When the entire length of the tubular liner bag is everted (i.e., turned inside out) into the pipe, the control rope holds the closed end of the tubular liner bag to thereby control the length of the tubular liner in the pipe. The everted tubular liner is pressed against the inner wall of the pipe by the pressurized fluid. The tubular liner is hardened as the thermosetting resin impregnated in the tubular liner bag is cured.

This process enables a pipe to be repaired without excavation or disassembly. However, if the process is applied to an underground pipe into which ground water penetrates, the problem arises that the thermosetting resin impregnated in the tubular pipe liner bag may be diluted or wash out of the material before it cures. Thus, neither adequate strength of the liner nor an adequate bond between the insert liner and the pipe may be maintained. Also, during the insertion process, material may accumulate on the outside of the resin impregnated liner bag, thereby reducing available bonding surface and consequently strength and sealing capabilities of the repair. In addition, void areas where resin is not present can occur in the liner bag, thereby causing areas of weakness and areas where the liner fails to properly bond to the pipe.

Accordingly, there remains a need for an efficient and cost-effective way to adequately reinforce pipes so as to increase their resistance to structural failure due to deterioration.

SUMMARY OF THE INVENTION

In accordance with the present invention, a pipe system structure including a pipe wall having an internal and an external surface, a reinforcement layer overlaying at least a portion of the internal or external surface, the reinforcement layer having at least one fabric layer impregnated with resin and an adhesive material applied to the surface of the pipe wall or the reinforcement layer for bonding the reinforcement layer to the surface of the pipe wall to develop a composite system between existing pipe and the reinforcement layer.

In one form of the invention, the fabric layer is in substantially one section and is in a partially cured state. In one embodiment, the fabric layer is rolled up to be easily carried through an existing passageway, such as a manhole, and is then applied to the internal surface of the pipe. An internal device such as a clamp or a balloon is then used to hold the section of the fabric in place while bonding occurs. In another embodiment, the fabric layer is rolled up but is applied to the external surface of the pipe.

In another form of the invention, the fabric layer is pre-formed in a plurality of sections and is prepared outside of the pipe. The plurality of sections of the fabric layer are then easily carried through the existing passageway to the inside of the pipe and applied to the internal surface of the pipe. Alternatively, the plurality of sections are applied to the external surface of the pipe.

In yet another form of the invention, the adhesive material includes a tack coat, such as contact cement, for holding the reinforcement layer to the pipe wall on contact. Alternatively, the adhesive material includes a wet primer coat and a tack coat.

The present invention enables the interior of the pipe to be reinforced by using an existing passageway, such as a manhole, to access the interior of the pipe. The reinforcement material is delivered to the interior of the pipe through these existing passageways. In a preferred form of the invention, the surface of the pipe is cleaned of debris and then dried before the bonding of the reinforcement layer to the pipe surface.

BRIEF DESCRIPTION OF THE DRAWINGS

The above discussed features and other features and attendant advantages of the present invention will become better understood by reference to the following detailed description when taken in conjunction with the accompanying drawings, in which.

Like reference symbols are employed in the various drawings and in the description of the preferred embodiment to represent the same or similar items.

DETAILED DESCRIPTION OF THE PREFERRED EMBODIMENT

Figure 1:
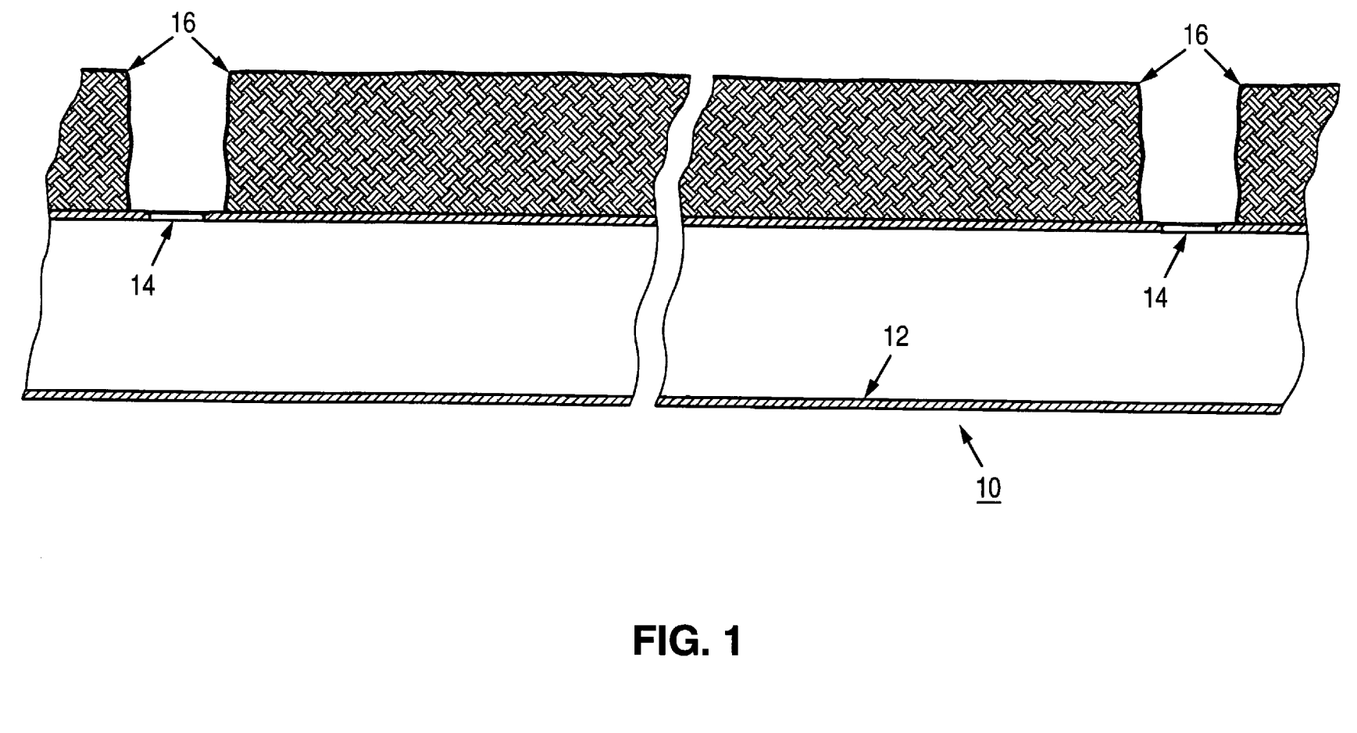
FIG. 1 shows the typical layout of a large diameter underground pipe, including access openings.

The present invention has wide application to the reinforcement of existing pipes or other conduits located either above or below ground. The following detailed description describes use of the invention to reinforce a pipe of circular cross-section buried underground. However, it will be understood by those skilled in the art that the invention is not limited to such pipes, but also may be applied to pipes of any size and any cross-sectional shape. FIGS. 1–8 illustrate a typical order of steps for reinforcing pipes in accordance with the invention. FIG. 1 shows a sectional view of an underground pipe 10 to be reinforced. Pipe 10 in this example is concrete. However, the pipe could equally be made from wood, metal or other materials.

Initially, if necessary, pipe 10 is shut down to permit workers to enter and work in the pipe. Existing openings, such as manholes 14 provide workers with access via access openings 16 to the interior of pipe 10. Typically, such manholes 14 are arranged along the length of pipe 10 in approximately one mile intervals.

Figure 2:
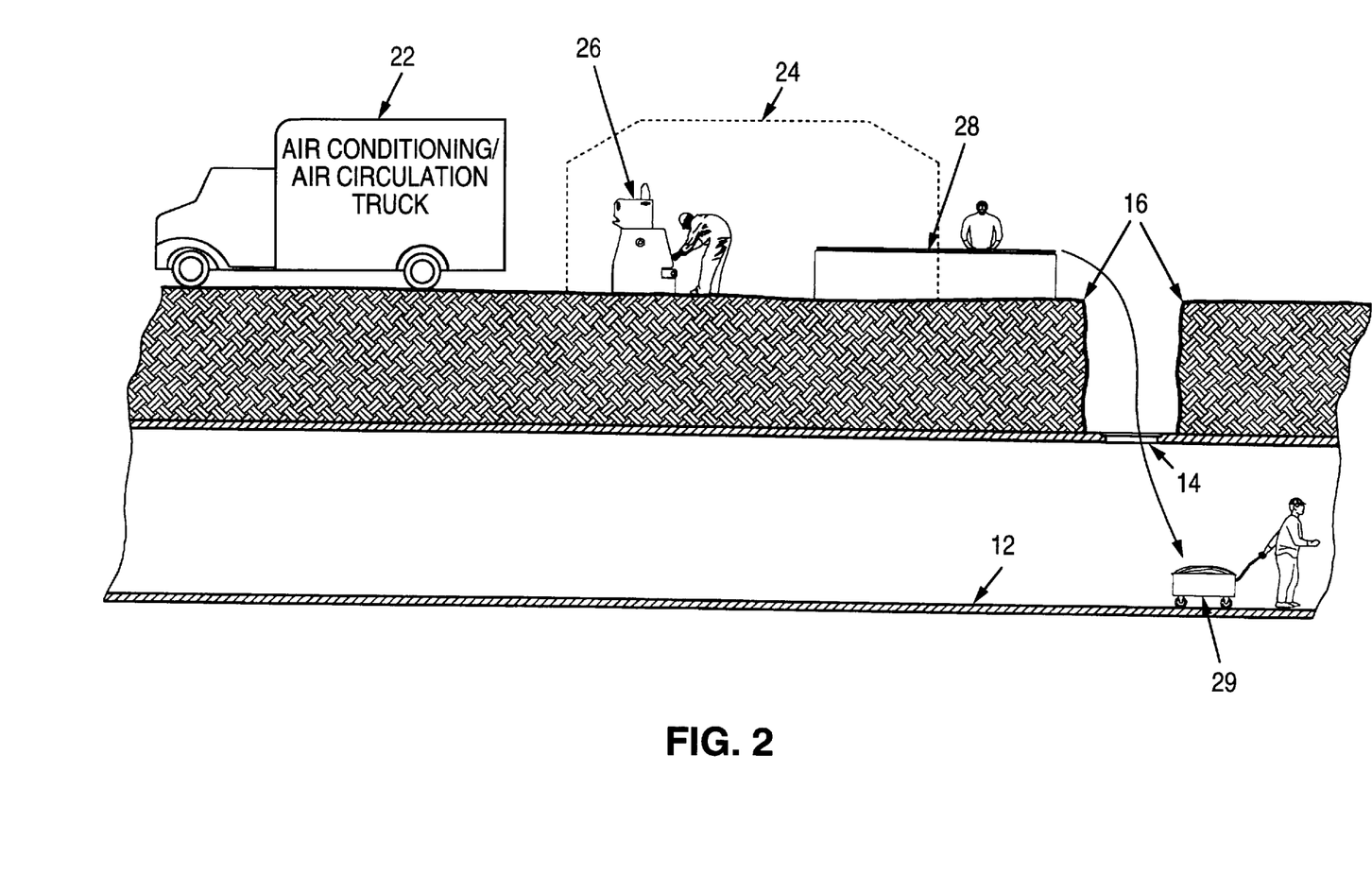
FIG. 2 is a view of the pipe shown in FIG. 1, and including features highlighting preparation of materials for use in the method of the invention.

In one embodiment of a pipe reinforcing system, the equipment used for implementing the process is set up aboveground, near the entrance to pipe 10, as shown in FIG. 2. An air conditioning/air circulation truck 22 situated near access 16 entrance of manhole 14 provides the necessary air ventilation and air circulation for the workers inside pipe 10. A tent 24 may also be assembled at the entrance of manhole 14 to house and protect both the reinforcing material to be used in the method and the equipment 26 for preparing the reinforcing material. A layout table 28 is used to layer the reinforcing material, take samples for testing, and to allow the reinforcing material to slightly pre-cure for ease of application. A carrying machine, such as a wagon 29, can also be used to facilitate movement of the reinforcing material through manhole 14 and into pipe 10.

Figure 3:
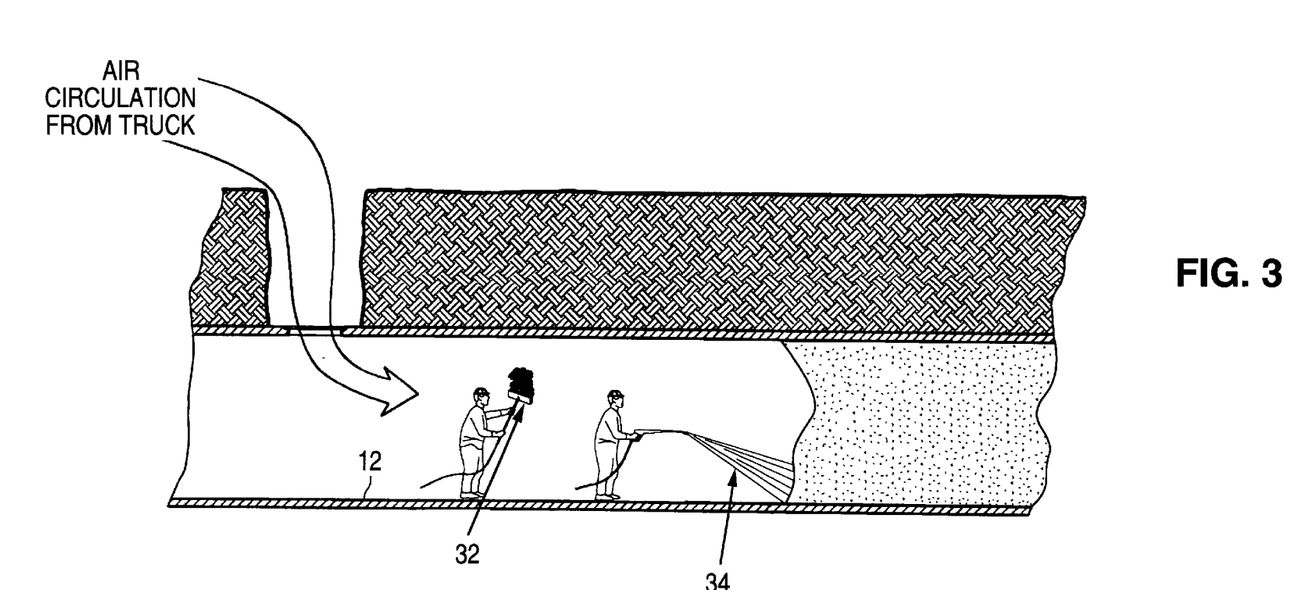
FIG. 3 shows a view highlighting the surface cleaning step of the method of the invention.

Existing pipe 10 may need to be reinforced by applying reinforcing material to either the interior or the exterior surface of pipe 10. In a first embodiment, as shown in FIGS. 1–6, the reinforcing material is applied to an interior surface 12 of pipe 10. It is preferred that the interior surface 12 of pipe 10 be thoroughly cleaned to remove any debris attached to pipe surface 12 prior to application of the reinforcing material, as shown in FIG. 3. Since bonding of a resin matrix and the reinforcement material to surface 12 of pipe 10 is preferred, pipe surface 12 should be sufficiently clean so that the resin matrix adheres well to the pipe wall. In one embodiment, this cleaning process is performed by a machine including a hose 34 which creates a water blast force (e.g., 10,000 psi) to loosen the debris and a scrub brush 32 to thoroughly clean pipe wall 12. Pipe wall 12 is then dried using either an air drying or a chemical drying process. For example, compressed air or sodium can be used to clean off the excess water from the pipe surface. Sandbags also can be used to separate the area to be reinforced to keep it clean and dry.

After the interior surface 12 of pipe 10 has been cleaned, it is often desirable (though not necessary) to repair the cracks in the pipe wall. For example, an epoxy injection material may be used to repair small circumferential hoop direction cracks. In addition, a portion of the pipe wall to be reinforced can be coated with a wet primer before application of the reinforcing material to the surface. If the surface is porous or has cracks, it may be desirable to allow the wet primer to penetrate the surface before applying the resin impregnated fabric layers to the pipe wall. In one embodiment, a water insensitive, high bond strength epoxy, such as TYFO® WP Epoxy, is applied to the pipe surface. This epoxy fills voids in the pipe surface and functions as a prime coat to which the composite reinforcement layer bonds. Subsequently, a tack coat, such as a contact cement, is applied to the primer coat. The tack coat layer provides stronger adhesion and is therefore particularly useful when bonding overhead.

The reinforcing material is then applied to interior surface 12 of pipe 10. The composite reinforcement material is preferably formed by applying fabric layers impregnated with resin to the pipe wall. Examples of the fabric layers that may be used to reinforce the pipe are disclosed in U.S. Pat. No. 5,649,398, U.S. Pat. No. 5,218,810 and co-pending patent application Ser. No. 08/496,743 filed Jun. 29, 1995, each of which is incorporated by reference herein. In general, the fabric is highly resistant to both aggressive chemicals and waste water.

Where a single layer of fabric is used, it will often be desirable to use weft cloth containing both horizontal and vertical fibers. Where multiple layers of fabric are used, it will often be desirable to alternate the orientation of the fibers to provide maximum strength along multiple axes. In one embodiment, the multilayer reinforcement material has an inner layer of longitudinal axial fibers and an outer layer of circumferential hoop fibers. For example, when two high strength composite reinforcement layers are applied to the pipe wall, the first reinforcement layer includes two fabric layers of carbon fibers in a longitudinal direction and the second high strength composite reinforcement layer includes three layers of carbon fibers in the hoop direction. In another embodiment, uncured high strength composite reinforcement layers are spirally wound around the inside surface of the pipe. In this manner, the method of the invention not only improves the integrity of the pipe, but also significantly reinforces the pipe against externally applied forces.

Actual application of reinforcing fabric can be accomplished in more than one way. In a first embodiment, the fabric is unwound from a roll and dipped in resin for impregnation prior to application to the pipe surface. For example, as shown in FIG. 2, the fabric is fed through machine 26 to saturate the reinforcing material with the resin. The fabric is rolled as it is fed through the machine 26 so that the fabric can be easily applied to the pipe wall with a roller. Once a sufficient length of fabric has been impregnated within the resin, the impregnated fabric layer is cut from the roll and is applied to the face of the wall. In one embodiment, the resin impregnated fabric layer is allowed to partially cure outside of the pipe prior to entering the pipe, to allow for ease of application once inside the pipe. In another embodiment, the resin impregnated fabric layer expands to cover the desired section of the pipe. An internal device, such as a clamp or a balloon, may be used to assist in holding the reinforcing material until curing has taken place. Thus, the fabric layer is allowed to cure once in place on the pipe surface to form the composite reinforcement layer. The impregnation and application process is repeated until the selected portion of the pipe surface has been covered.

Alternatively, it is desirable (though not necessary) that the composite reinforcement layers be pre-formed in sections. It is also preferable that these preformed sections be small enough to fit through the existing passageway, e.g., manhole, to facilitate the reinforcement process. In this way, the reinforcing material can be easily delivered to the pipe, transported to the section of the pipe to be reinforced, and applied to the pipe wall. If pre-formed sections are used, seams are spliced together using lap splice pieces comprised of sections of fabric impregnated with resin. For the lap splice pieces, as well as other areas where layers of fabric overlay, the layers should have a small overlap for corrosion protection and to provide maximum transverse strength.

It is preferred that the fabric layers of a composite reinforcement layer be placed on the pipe surface so that substantially the entire pipe surface is covered. However, in certain applications, it may be desirable to only cover those portions of a pipe surface that are most likely to fail. Typically, a pipe to which reinforcing material has been applied according to the invention will be ready to be subjected to water pressure after approximately 10 hours.

Figure 4:
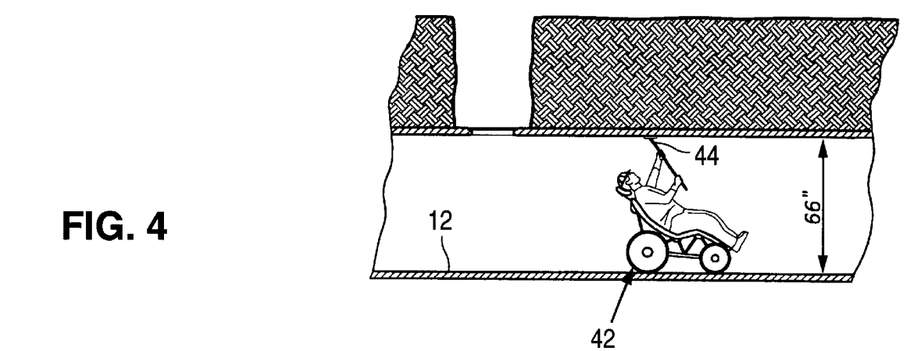
FIG. 4 shows a view highlighting the step of the invention in which reinforcing material is applied to an inner surface of a pipe.

There are several different methods of applying the reinforcing material to the interior surface 12 of pipe 10, some of which are more desirable than others, depending on the diameter of pipe 12. When the interior diameter pipe of the pipe is too small to permit workers to stand inside, the process for the wrapping the reinforcing material can include a working seat 42 to permit the worker to apply the reinforcement material as shown in FIG. 4. In this exemplary embodiment, the diameter of pipe 10 is shown as 66". Thus, working seat 42 facilitates the ease with which a worker is able to manually apply the reinforcing material with a roller 44 inside narrow pipe 10.

Figure 5:
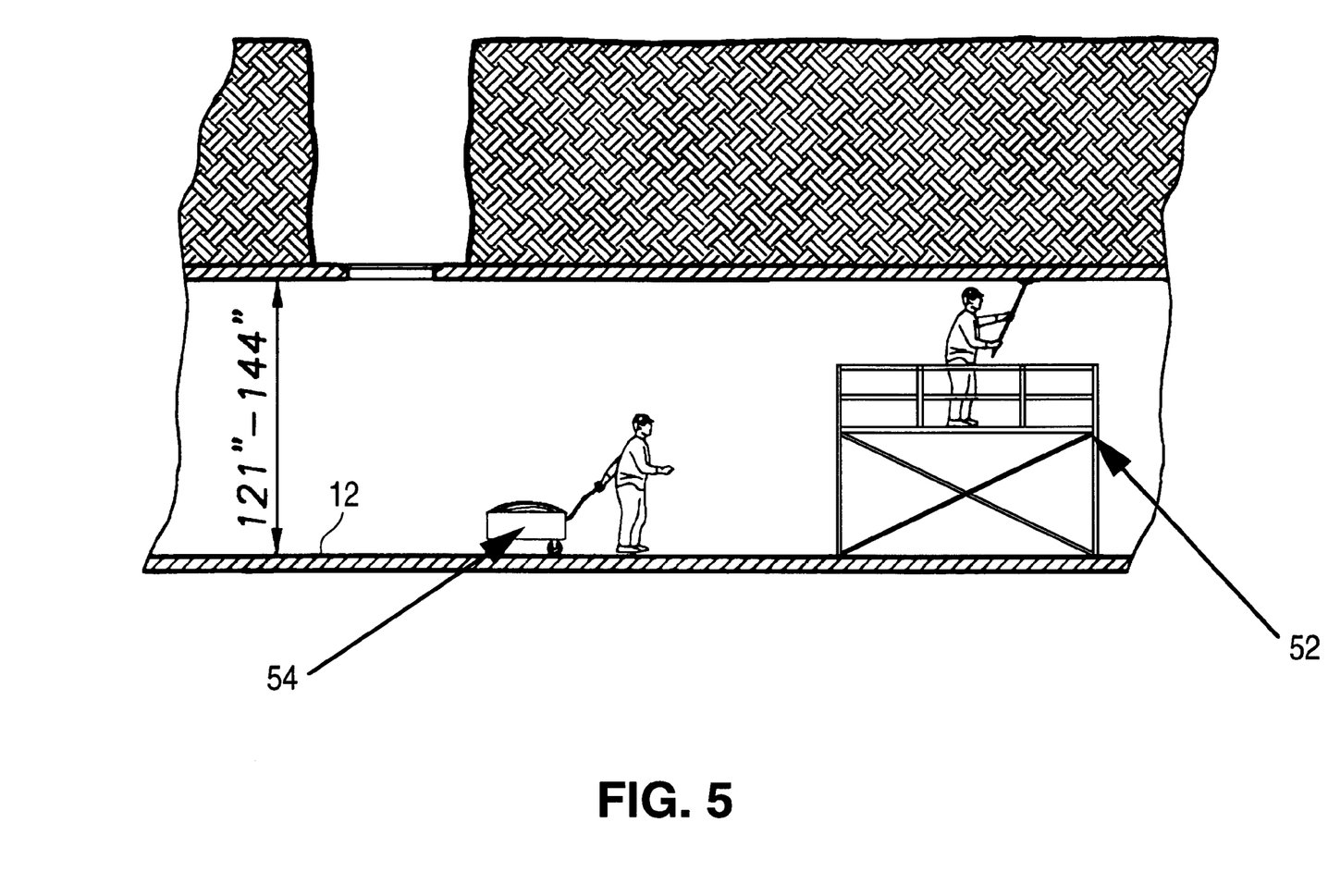
FIG. 5 shows an alternative method for applying reinforcing material to an inner surface of a pipe.

In contrast, when the interior diameter of pipe 10 exceeds that in which a worker could stand and apply the reinforcing material, a scaffolding 52 can be constructed as shown in FIG. 5. In this exemplary embodiment, the diameter of pipe 10 is shown in the range of 121"–144". In both of these embodiments, the reinforcing material can be transported to the desired location using a carrier such as wagon 64. In addition, although FIGS. 4 and 5 illustrate the process of applying reinforcing material by using a roller to roll the material onto the interior surface 12 of pipe 10, it will be appreciated that the present invention can be implemented using other application techniques.

Figure 6:
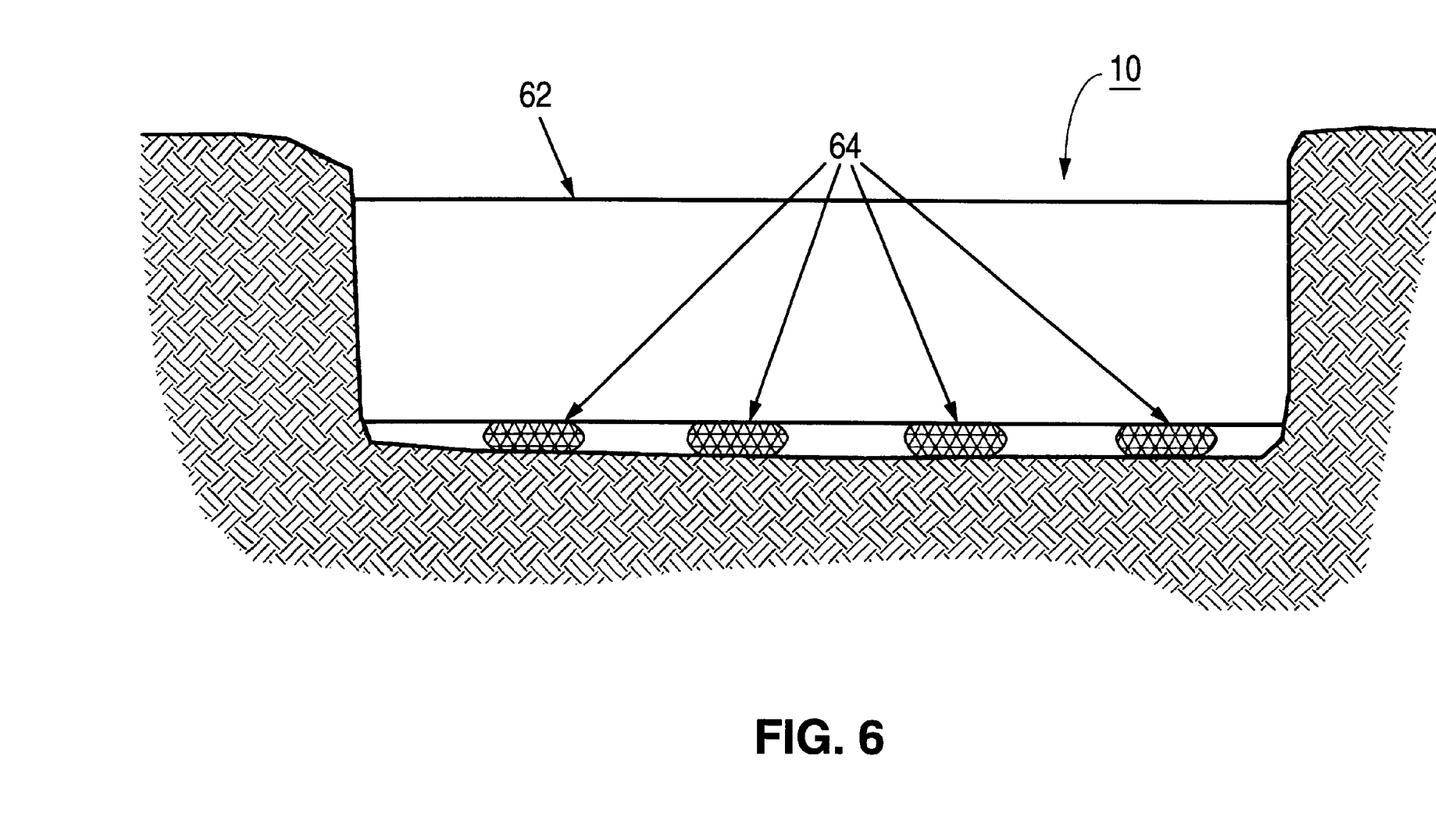
FIGS. 6 and 7 show a method of applying reinforcing material to the exterior of a pipe.

In a second embodiment of the reinforcing material application method of the invention, pipe 10 can be reinforced by applying the reinforcing material to an exterior surface 62 of pipe 10, as shown in FIG. 6. Such a reinforcing process involves excavating a section of pipe 10 to be reinforced to expose exterior surface 62. A system of high strength and high pressure airbags 64 are placed around the exterior of pipe 10 to support the section of the pipe to be reinforced during the reinforcing process. For example, as shown in FIG. 6, airbags 64 are provided between the ground and the bottom portion of pipe 10.

Figure 7:
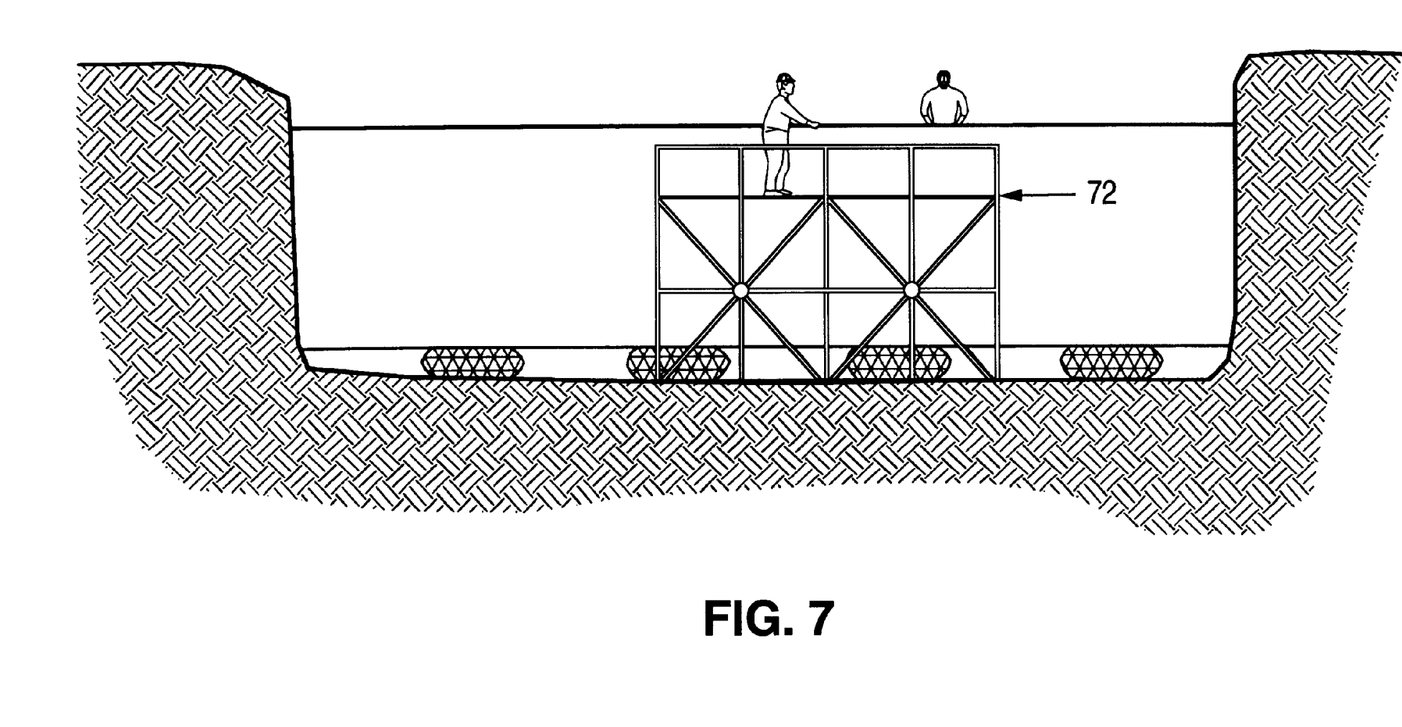

Exterior surface 62 of pipe 10 is then cleaned and dried to promote better bonding of the reinforcing material to the exterior surface. This cleaning process is similar to that used to clean interior surface 12 of pipe 10. Subsequently, the reinforcing material is applied to pipe 10. The reinforcing material used is the same as that applied to interior surface 12 of pipe 10. A scaffolding 72 can be assembled along the exterior of pipe 10 and within the excavation to facilitate the cleaning process and the application of the reinforcing material to pipe 10, as shown in FIG. 7.

An advantage to reinforcing existing pipe 10 by applying the reinforcing material to external surface 62 is that the reinforcing process can be conducted while maintaining pipe 10 in service.

In all of the embodiments, curing of the resins is carried out in accordance with well known procedures which will vary depending on the resin matrix used. Various conventional catalysts, curing agents and additives which are typically employed with such resin systems may be used. It is desirable to use preformed sections of fabric in a cured or a partially cured state to further minimize time spent inside the pipe. Once the resin is cured, the combination of the fabric layers, the fabric members and the cured resin form an integral high strength composite which is permanently bonded to the pipe surface. Advantageously, the resin-impregnated fabric members in the above described surface are almost invisible and thus the foregoing method is useful when aesthetic considerations are important.

It is desirable (though not necessary) that the composite reinforcement layers further include an exterior layer of a pre-stressed form, such as stretch wrap, when wrapping the exterior surface of the pipe. Once the reinforcement layer has been wrapped around the surface of the pipe, stretch wrap or other similar thin wrapping layer is wrapped over the reinforcement layer to assist in holding it in place for better bonding. The stretch wrap may be removed after final curing or, alternatively, it may be held in place. Any of the commonly used stretch wrap materials may be used to provide the containment layer. Stretch wrap is a polymer film which is widely used and readily available from any number of commercial sources. For example, stretch wrap is available from Mobil Oil Corporation under the trade names MOBILWRAP or MOBIL MASTERWRAP. The wrap is also sold by Borden Chemical Co. under the trade name BORDEN HANDWRAP.

When wrapping inside the pipe, the use of an additional wrap material over the reinforcement layer is particularly preferable in situations where the pipe is subjected to turbulence. For example, the use of a plastic wrap is particularly preferred where fast flowing and/or turbulent water may be flowing through the pipe.

If desired, the exposed surface of the composite reinforcement layer may be coated with a desired surface protectant, e.g., paint, urethane, acrylic, etc. In applications where it is preferable that the composite reinforcement layer be resistant to corrosion, a commercially available corrosive protectant coating may be used.

It will be appreciated by those skilled in the art that the suitable materials for the wet primer, the tack coat, and resins for impregnating the fabric material, and the finish materials in accordance with the present invention include polyester, epoxy, vinylester, acrylic, modified acrylic, urethane, phenolic, polymide, bismaleimide, polyurea, or combinations thereof with epoxy being a preferred resin. Other materials may be utilized provided that they have the same degree of strength and toughness provided by the previously listed resins. In most applications, thermoset resins are preferred. However, enhancements to the process will allow the use of thermoplastic resin systems. Although the polymer materials may be mixed in the pipe, it is preferable that the materials be mixed outside the pipe to minimize the time spent inside the pipe.

In all of the embodiments of the present invention, the reinforcing composite material may be adhered to the structural member, such as the pipe wall, through the adhesive properties of the polymer matrix itself, an additional adhesive, fiber fasteners, or other anchoring means.

All of the embodiments described above may be modified if desired for retrofit and repair of already damaged structures. Pipe systems normally require strengthening in the longitudinal direction as well as in the hoop direction. Therefore, the damaged structures are examined to determine the actual fracture pattern present, and the cloth type, weave, fiber direction, and bias angle of cut are modified to provide maximum strength. In this way, an optimum weave design can be chosen to repair the pipe in both directions.

A wide variety of composite materials may be used. While fabric impregnated with epoxy resin to reinforce a concrete pipe has been illustrated, those skilled in the art will appreciate that the present invention may be used with a wide variety of fibers and polymer matrices to reinforce a similarly wide variety of structures.

The fabric for example, may be comprised of glass, graphite, polyaramid, boron, Kevlar, silica, quartz, ceramic, polyethylene, aramid, or other fibers. A wide variety of types of weaves and fiber orientations may be used in the fabric. Preferably, the fiber and polymer matrix are waterproof.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for reinforcing a wall of a pipe, the method comprising the steps of:

applying a tack coat to at least a portion of an internal or an external surface of the pipe wall;

applying a composite reinforcement layer to the tack coat to adhere the composite reinforcement layer to the internal or external surface of the pipe wall, the composite reinforcement layer comprising at least one fabric layer comprised of fibers in a polymer matrix.

2. The method of claim 1, wherein the composite reinforcing material is pre-formed.

3. The method of claim 1, wherein the step of affixing the reinforcement layer to the internal or the external surface comprises affixing the reinforcement layer to the internal or the external surface using a method selected from the group consisting of adhesives and fasteners.

4. The method of claim 1 wherein the composite reinforcement layer is applied to the internal surface of the pipe wall, further comprising the steps of:

accessing the internal surface of the pipe through an existing passageway; and cleaning the internal surface of the pipe of debris.

5. The method of claim 4, further comprising the step of drying the external or internal surface of the pipe prior to applying the tack coat.

6. The method of claim 4, wherein the existing passageway comprises a manhole.

7. The method of claim 1 wherein the composite reinforcement layer is applied to the external surface of the pipe wall, further comprising the steps of:

excavating the pipe to expose a portion of the external surface of the pipe; and cleaning the external surface of the pipe of debris.

8. The method of claim 7, wherein the step of affixing the reinforcement layer to the internal or external surface comprises affixing the reinforcement layer to the external surface using a scaffolding.

9. The method of claim 1, further comprising the step of:

applying a resin to the internal or the external surface of the pipe wall prior to applying the tack coat to fill irregularities in the internal or the external surface of the pipe wall.

10. A method for reinforcing a wall of a pipe, the method comprising the steps of:

applying a composite reinforcement layer impregnated with a resin in an uncured state to the pipe wall so as to cover at least a portion of a surface of the pipe wall, the composite reinforcement layer comprising at least one fabric layer having fibers;

partially curing the resin impregnated within the composite reinforcement layer while in place on the surface of the pipe wall.

11. The method of claim 10, wherein the reinforcement layer is held in clamped engagement with the surface of the pipe wall while the resin impregnated in the composite layer partially cures.

12. The method of claim 10, wherein the composite reinforcing material is pre-formed.

13. The method of claim 10 wherein the composite reinforcing layer is applied to an internal surface of the pipe wall, further comprising the steps of:

accessing the internal surface of the pipe through an existing passageway; and cleaning the internal surface of the pipe of debris prior to applying the composite reinforcement layer to the surface of the pipe wall.

14. The method of claim 13, further comprising the step of drying the surface of the pipe prior to applying the composite reinforcement layer to the surface of the pipe wall.

15. The method of claim 13, wherein the existing passageway comprises a manhole.

16. The method of claim 10 wherein the layer is applied to an external surface of the pipe wall, further comprising the steps of:

excavating the pipe to expose a portion of the external surface of the pipe; and cleaning the external surface of the pipe of debris prior to applying the composite reinforcement layer to the surface of the pipe wall.

17. The method of claim 10, further comprising the step of:

applying a resin to the surface of the pipe wall prior to applying the composite reinforcement layer to fill irregularities in the surface of the pipe wall.

18. The method of claim 10, further comprising the step of:

applying a tack coat to the surface of the pipe wall prior to applying the composite reinforcement layer to the surface of the pipe wall.

* * * * *

(12) EX PARTE REEXAMINATION CERTIFICATE (6166th)
United States Patent
Raji et al.

(10) Number: US 5,931,198 C1
(45) Certificate Issued: Apr. 1, 2008

(54) FABRIC REINFORCED PIPE

(76) Inventors: Brian Behzad Raji, 1109 W. Lakeridge Dr., Gilbert, AZ (US) 85233; Edward Robert Fyfe, 1339 Ocean Ave., Del Mar, CA (US) 92014

Reexamination Request:
No. 90/008,527, Mar. 14, 2007

Reexamination Certificate for:
Patent No.: 5,931,198
Issued: Aug. 3, 1999
Appl. No.: 08/961,534
Filed: Oct. 30, 1997

(51) Int. Cl.
*F16L 55/162* (2006.01)

(52) U.S. Cl. ............................. 138/98; 138/99; 138/97
(58) Field of Classification Search .................. None
See application file for complete search history.

(56) References Cited

U.S. PATENT DOCUMENTS

| | | |
|---|---|---|
| 3,424,203 A | 1/1969 | Rubenstein |
| 4,676,276 A | 6/1987 | Fawley |
| 5,447,593 A | 9/1995 | Tanaka et al. |
| 5,451,351 A | 9/1995 | Blackmore |
| 5,606,997 A | 3/1997 | Blackmore et al. |

FOREIGN PATENT DOCUMENTS

| | | |
|---|---|---|
| EP | 0378232 | 4/1993 |
| WO | WO 94/05945 | 3/1994 |

OTHER PUBLICATIONS

Komatsu and Tanaka, "Reinforcement Tests of Cylindrical Structures with Fiber–reinforced Sheets," the 47th Japan Society of Civil Engineering Annual Meeting, Apr. 1992, pp. 372–373.

"Carbon Fiber Sheet Strengthening of Concrete and Masonry," A Brochure from Structural Preservation Systems, Inc., 1995.

"REPLARK™—Carbon Fiber Prepreg Sheet for Construction Industries," A Brochure from Mitsubishi, Inc., ???? (unable to determine the date).

WTEC Monograph on Use of Composite Materials in Civil Infrastructure in Japan (Aug. 1998) PB98–158215.

Taerwe ed., "Non–metallic (FRP) Reinforcement for Concrete Structures," Proceedings of the Second RILEM Symposium (FRPRCS–2) Aug. 1995, Ghent, Belgium, pp. 1–714.

"Potential Applications for TYPO S™–Fiberwrap™: Installation Procedures," A Product Brochure from Hexcel–Fyfe Co., 1994.

Saadatmanesh and Ehsani, "Fiber Composite Plates Can Strengthen Beans," Concrete International: Design & Construction, Mar. 1990, vol. 12, pp. 65–71.

"After the Quake–Fabric mesh composites and epoxy give new life to damaged Structures," Arizona Civil View, Fall 1994, vol. 3, No. 1, pp. 1, 7, and 11.

*Primary Examiner*—Joseph A. Kaufman (57) ABSTRACT

Reinforcement of buried or inaccessible existing pipes is achieved by applying a reinforcement layer which includes a fabric portion. A pipe system structure is achieved which permits an internal or external surface of an existing pipe wall to be reinforced without removing a section of the pipe and without requiring the pipe to be out of service of a long period of time. The reinforcement layer overlays a portion of the internal or the external surface of the pipe. An adhesive material is then applied to the surface of the pipe or to the reinforcement layer for bonding the reinforcement layer to the surface of the pipe to develop a composite system between the existing pipe and the reinforcement layer.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 18 is cancelled.

Claims 1 and 10 are determined to be patentable as amended.

Claims 2–9 and 11–17, dependent on an amended claim, are determined to be patentable.

1. A method for reinforcing a wall of a pipe, the method comprising the steps of:

applying a tack coat to at least a portion of an internal or an external surface of the pipe wall;

applying a composite reinforcement layer to the tack coat to adhere the composite reinforcement layer to the internal or external surface of the pipe wall, the composite reinforcement layer comprising at least one fabric layer comprised of *circumferential hoop* fibers in a polymer matrix.

10. A method for reinforcing a wall of a pipe, the method comprising the steps of:

*applying a tack coat to at least a portion of an internal or an external surface of the pipe wall;* applying a composite reinforcement layer *to the tack coat, wherein the composite reinforcement layer is* impregnated with a resin in an uncured state to the pipe wall so as to cover at least a portion of a surface of the pipe wall, *and wherein* the composite reinforcement layer [comprising] *further comprises* at least one fabric layer having *circumferential hoop* fibers; *and* partially curing the resin impregnated within the composite reinforcement layer while in place on the surface of the pipe wall.

\* \* \* \* \*